(12) United States Patent
Horng et al.

(10) Patent No.: US 9,231,448 B2
(45) Date of Patent: Jan. 5, 2016

(54) MOTOR

(71) Applicant: Sunonwealth Electric Machine Industry Co., Ltd., Kaohsiung (TW)

(72) Inventors: Alex Horng, Kaohsiung (TW); Ko-Chien Wang, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 449 days.

(21) Appl. No.: 13/667,029

(22) Filed: Nov. 2, 2012

(65) Prior Publication Data
US 2013/0285495 A1    Oct. 31, 2013

(30) Foreign Application Priority Data

Apr. 25, 2012  (TW) .............................. 101114747 A

(51) Int. Cl.
*H02K 21/12* (2006.01)
*H02K 3/52* (2006.01)
*H02K 5/167* (2006.01)

(52) U.S. Cl.
CPC .............. *H02K 3/522* (2013.01); *H02K 5/1675* (2013.01)

(58) Field of Classification Search
CPC ..... H02K 1/187; H02K 15/022; H02K 15/14; H02K 21/12
USPC ................................................. 310/90, 67 R
See application file for complete search history.

(56) References Cited

U.S. PATENT DOCUMENTS

| 6,882,074 | B2 * | 4/2005 | Horng et al. ..................... 310/90 |
| 7,498,704 | B2 * | 3/2009 | Otsuki et al. .................. 310/90.5 |
| 2008/0169733 | A1 * | 7/2008 | Lin et al. ....................... 310/67 R |
| 2009/0309437 | A1 * | 12/2009 | Horng et al. ..................... 310/90 |
| 2009/0309438 | A1 * | 12/2009 | Horng et al. ..................... 310/90 |
| 2010/0127588 | A1 * | 5/2010 | Horng ............................. 310/90 |
| 2010/0232993 | A1 * | 9/2010 | Yabuuchi et al. ........... 417/423.7 |

FOREIGN PATENT DOCUMENTS

| CN | 101752941 A | 6/2010 |
| TW | M379926 U | 5/2010 |
| TW | M419336 U | 12/2011 |

\* cited by examiner

*Primary Examiner* — Joshua Benitez-Rosario
*Assistant Examiner* — Leda Pham
(74) *Attorney, Agent, or Firm* — Alan D. Kamrath; Kamrath IP Lawfirm, P.A.

(57) ABSTRACT

A motor includes a base, a stator, and a rotor. The base includes a shaft tube having an open end and receiving an inner assembly. The stator is mounted to an outer periphery of the shaft tube. The rotor is rotatably coupled to the inner assembly. The stator includes an insulating bobbin unit having an extension extending in a radial direction to the open end of the shaft tube. The extension includes an engagement hole. The shaft tube includes a positioning member having an engaging section engaged in the engagement hole. The insulating bobbin unit is fixed by an end of the engaging section. The engagement stability of the stator is enhanced by engagement of the positioning member of the base and the insulating bobbin unit.

21 Claims, 9 Drawing Sheets

MOTOR

BACKGROUND OF THE INVENTION

1. Field of the Invention

The present invention relates to a motor and, more particularly, to a motor having a stator that can be reliably positioned.

2. Description of the Related Art

A conventional motor generally includes a base, a stator, and a rotor. The base includes a shaft tube around which the stator is mounted. The rotor is rotatably coupled to the shaft tube. The stator generates an alternating magnetic field to drive the rotor to rotate.

The stator and the shaft tube are generally fixed together by press fitting or gluing. However, the stator is apt to disengage from the shaft tube if the stator is engaged with the shaft tube by press fitting. On the other hand, if the stator is fixed to the shaft tube by gluing, factors including the amount of the glue, the curing time of the glue, etc. must be considered, leading to inconvenience to assembly. Furthermore, if it is intended to miniaturize the motor, the axial height of the stator must be reduced (such as by reducing the number or the thickness of the silicon steel plates of the stator), leading to a decrease in the engaging area between the stator and the shaft tube. The stator is more likely to disengage from the shaft tube if press fitting is utilized.

FIG. 1 shows a conventional motor 8 including a shaft tube 81, a stator 82, and a rotor 83. A plurality of first engaging portions 811 is provided on a top end of the shaft tube 81. The stator 82 includes a lining 821, with a plurality of second engaging portions 822 formed on a periphery of a central opening of the lining 821. The first and second engaging portions 811 and 822 are fixed together by heat fusion. Thus, the stator 82 can reliably be fixed to the shaft tube 81 by the heat fusion structure formed by the first and second engaging portions 811 and 822. An example of such a structure is disclosed in Taiwan Utility Model No. M419336.

Although the motor 8 can provide the stator 82 with an enhanced positioning effect by using the first and second engaging portions 811 and 822, the first engaging portion 811 of the shaft tube 81 and the second engaging portion 822 of the lining 821 of the stator 82 do not extend to the opening of the top end of the shaft tube 81. Namely, the motor 8 can not provide advantages, such as directly closing the opening of the top end of the shaft tube 81 by the stator 82 (for providing anti-dust function or maintaining lubrication oil), pressing against members mounted in the shaft tube 81 (for positioning purposes), and retaining the rotor 83 (for the purposes of preventing disengagement). As an example, an oil seal 84 or the like is required to maintain the lubrication oil. However, the oil maintaining effect of the oil seal 84 mounted in the shaft tube 81 is not satisfactory. Furthermore, the oil seal 84 complicates the structure and reduces the assembling convenience.

FIG. 2 shows another conventional motor 9 including a base 91, a rotor 92, and a stator 93. The base 91 includes a shaft tube 911, with the rotor 92 rotatably coupled to the shaft tube 911. The stator 93 is mounted around the shaft tube 911 and includes an insulating bobbin 931 having a restraining member 932. The restraining member 932 extends to an opening of the top end of the shaft tube 911. The restraining member 932 retains members received in the shaft tube 911 and retains the rotor 92, preventing disengagement of the rotor 92. An example of such a motor is disclosed in Taiwan Patent Publication No. 200952307.

Compared to the conventional motor 8 of FIG. 1, the conventional motor 9 provides some advantages, including directly pressing the members in the shaft tube 911 by the stator 93 and retaining the rotor 92. However, the stator 93 providing the above advantages can only be mounted to the outer periphery the shaft tube 911 by fashions such as press fitting, leading to a poor positioning effect between the stator 93 and the shaft tube 911 as well as the risks of disengagement of the stator 93 due to heat expansion and cold shrinkage. Furthermore, if it is intended to miniaturize the motor 9, the stator 93 is apt to disengage from the shaft tube 911 if the stator 93 is mounted by press fitting. Thus, a novel structure for reliably fixing the stator 93 is required.

SUMMARY OF THE INVENTION

An objective of the present invention is to overcome the disadvantages of the conventional motors by provide a motor that utilizes the stator to close the shaft tube, to press against the members received in the shaft tube, and to retain the rotor while reliably positioning the stator.

The present invention fulfills the above objective by providing a motor including a base having a shaft tube with an open end. An inner assembly is received in the shaft tube. A stator is mounted to the outer periphery of the shaft tube and includes a silicon steel plate unit, an insulating bobbin unit, and a coil unit. A rotor includes a shaft rotatably coupled to the inner assembly in the shaft tube. The insulating bobbin unit of the stator includes an extension extending to the open end of the shaft tube. The extension includes a through-hole. The shaft extends through the through-hole. The insulating bobbin unit includes an engagement hole. The shaft tube of the base includes a positioning member having an engaging section. The engaging section extends through the engagement hole. The insulating bobbin unit is fixed in place by an end of the engaging section. Preferably, the engagement hole is formed beside the through-hole.

In an example, the extension of the insulating bobbin unit includes a pressing face that faces and presses against the inner assembly in the shaft tube.

In another example, the shaft includes an outer periphery having a retaining groove. The extension of the insulating bobbin unit includes a retaining end aligned with the retaining groove of the shaft. The retaining end extends into the retaining groove. The extension of the insulating bobbin unit can include a protrusion pressing against the inner assembly in the shaft tube.

Preferably, the end of the positioning member forms a fixing portion to fix the insulating bobbin unit.

Preferably, the engaging section of the positioning member extends beyond the open end of the shaft tube in a longitudinal direction of the shaft tube, with the fixing portion formed on the end of the engaging section distant to the open end.

The positioning member can include at least one column formed on at least one of an outer periphery of the shaft tube, an inner periphery of the shaft tube, and an end face of the shaft tube, with an end of the column distant to the open end forming the fixing portion. The stator can include a restraining groove receiving the column. Preferably, the restraining groove is formed between the stator and the outer periphery of the shaft tube.

In an example, the fixing portion of the positioning member is a punched section or a heat fusion section, and the fixing portion has an outer diameter larger than a diameter of the engagement hole of the insulating bobbin unit.

In another example, the fixing portion of the positioning member is a snap fastener that is forcibly inserted through the engagement hole of the insulating bobbin unit and protrudes from the engagement hole to fix on the surface of the insulating bobbin unit.

In a further example, the fixing portion of the positioning member and the extension are fixed by glue.

In another example, the fixing portion of the positioning member is a deformed section or a bent section that fixes the extension. The deformed section or the bent section can be a heat fusion section.

In an example, the insulating bobbin unit includes a recessed portion around the through-hole. The engagement hole is located in the recessed portion, and the fixing portion of the positioning member is received in the recessed portion.

In an example, the shaft tube includes a closed end opposite to the open end. The inner assembly includes a bearing and a retainer, with the bearing located adjacent to the open end, with the retainer located adjacent to the closed end, with the retainer located between the bearing and the closed end. The shaft includes an outer periphery having a retaining groove. The retainer extends into the retaining groove.

The insulating bobbin unit can envelope the silicon steel plate unit by injection molding.

Preferably, the silicon steel plate unit and the insulating bobbin unit are stacked.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
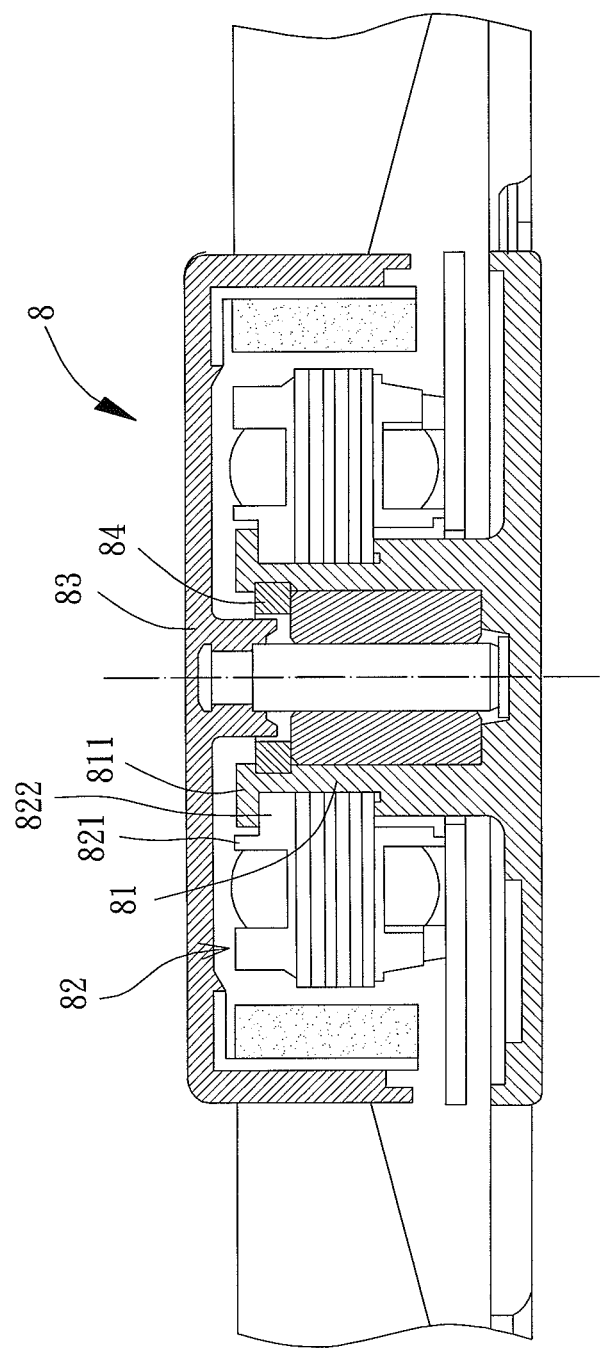
FIG. 1 shows a cross sectional view of a conventional motor.
Figure 2:
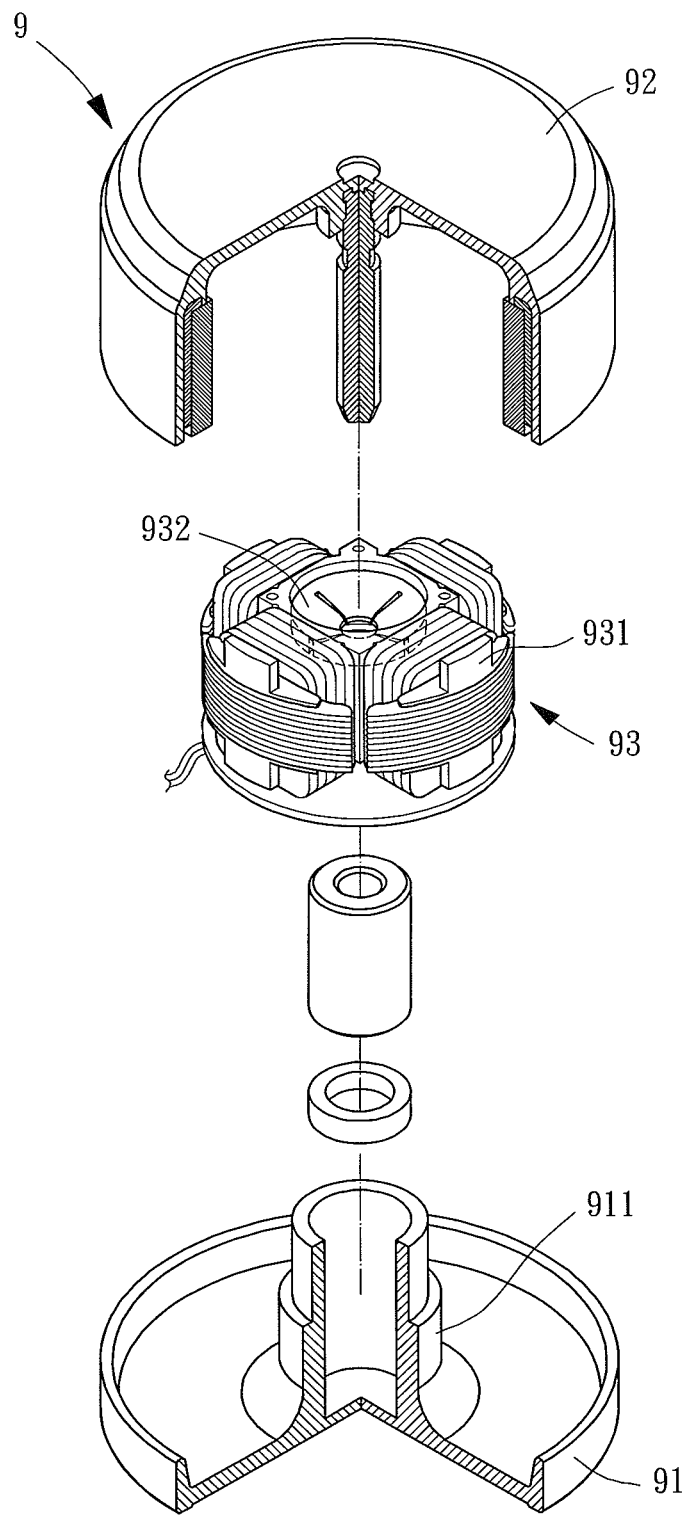
FIG. 2 shows an exploded, perspective view of another conventional motor.
Figure 3:
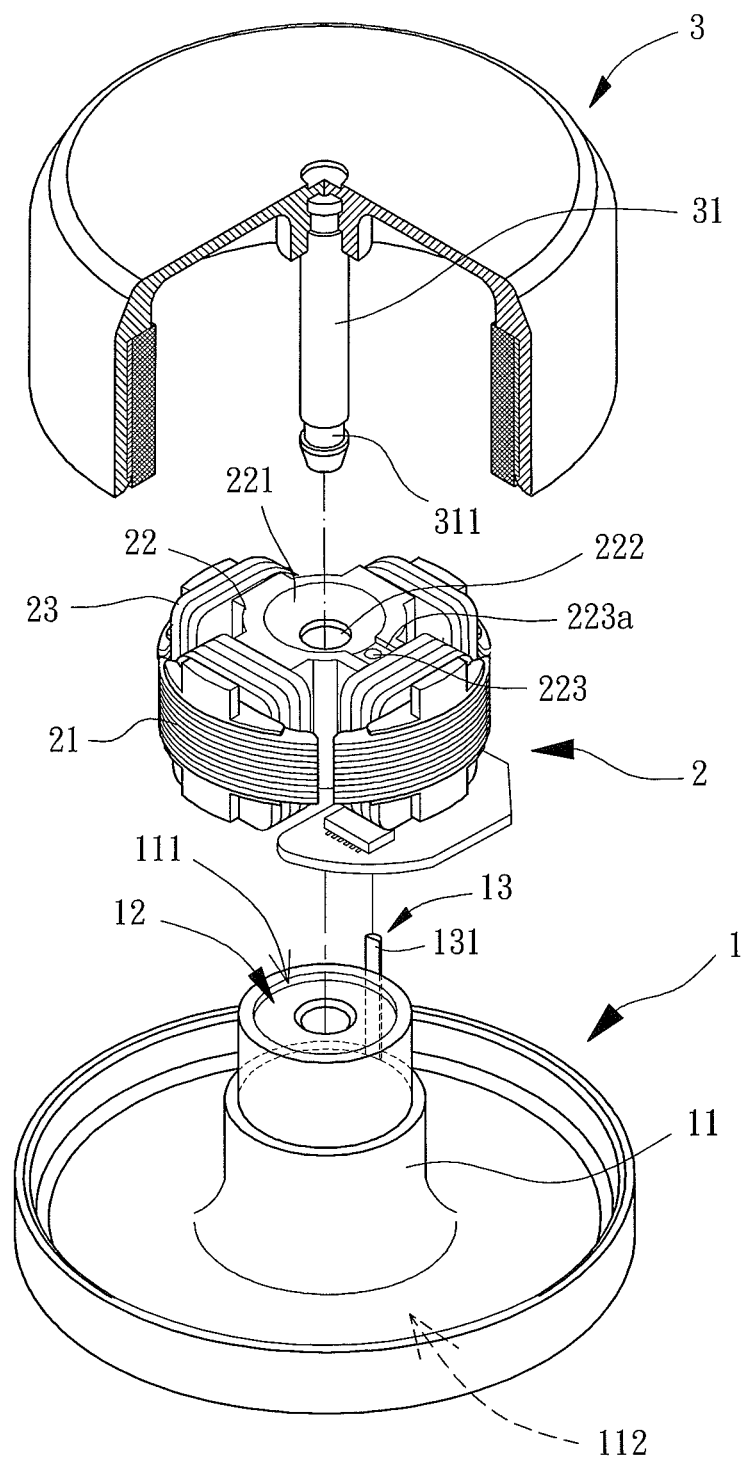
FIG. 3 shows an exploded, perspective view of an example of a motor according to the present invention.
Figure 4:
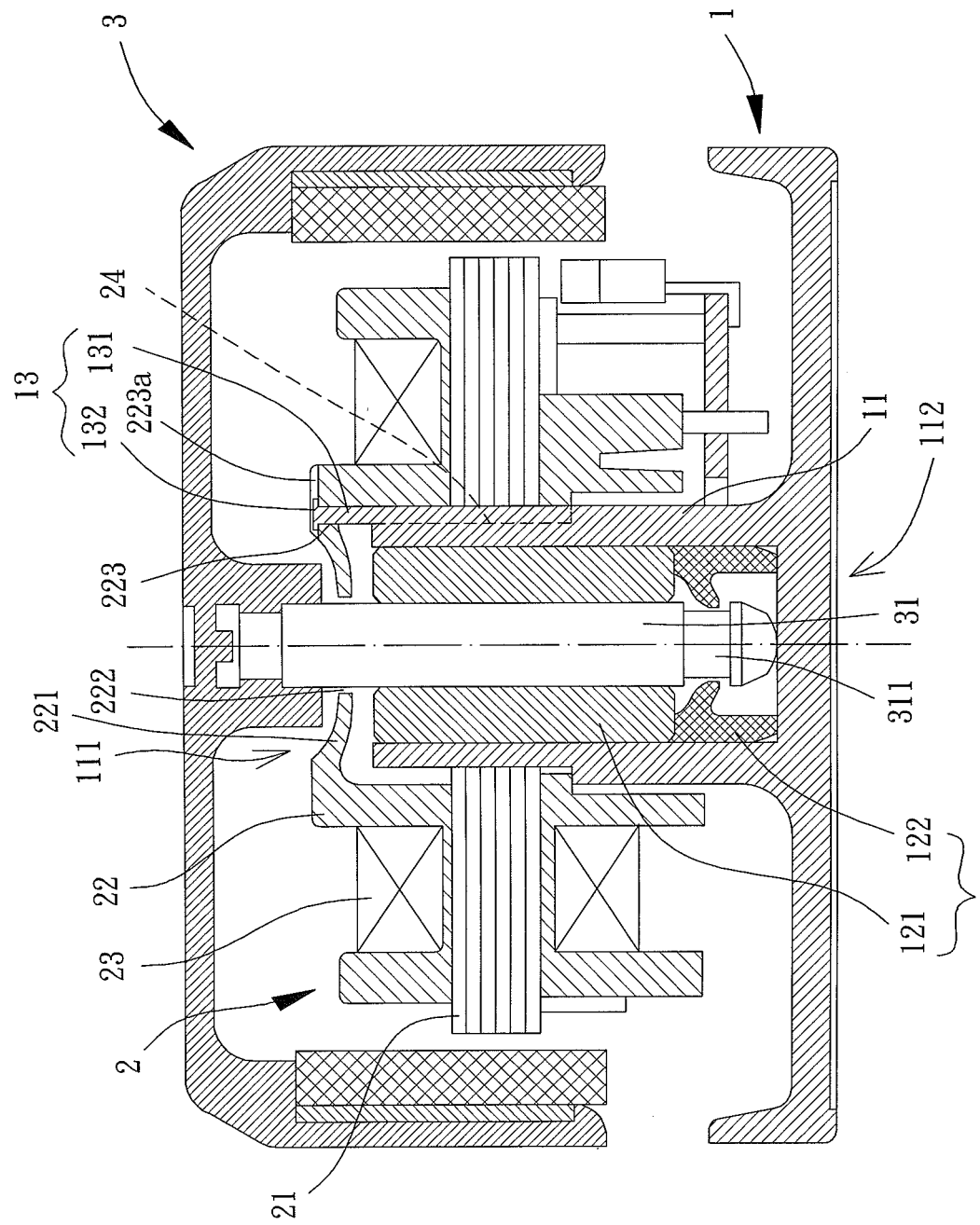
FIG. 4 shows a cross sectional view of the example of the motor according to the present invention, with a positioning member formed on an outer periphery of a shaft tube of the motor.

With reference to FIGS. 3 and 4, a motor according to the present invention includes a base 1, a stator 2, and a rotor 3. The stator 2 is mounted to the base 1. The rotor 3 is rotatably mounted to the base 1, and the stator 2 drives the rotor 3 to rotate.

The base 1 includes a shaft tube 11 having an open end 111 and a closed end 112. According to the direction of the drawing sheet of FIG. 3, the open end 111 is at a top of the shaft tube 11, and the closed end 112 is at a bottom of the shaft tube. Furthermore, an inner assembly 12 is received in the shaft tube 11. The inner assembly 12 can include members providing various functions, such as a bearing, an abrasion-resistant plate, a retainer, or a retaining ring. The inner assembly 12 includes at least the bearing. In the example shown in FIG. 4, the inner assembly 12 includes a bearing 121 and a retainer 122, with the bearing 121 located adjacent to the open end 111, with the retainer 122 located adjacent to the closed end 112, and with the retainer 122 located between the bearing 121 and the closed end 112.

Figure 5:
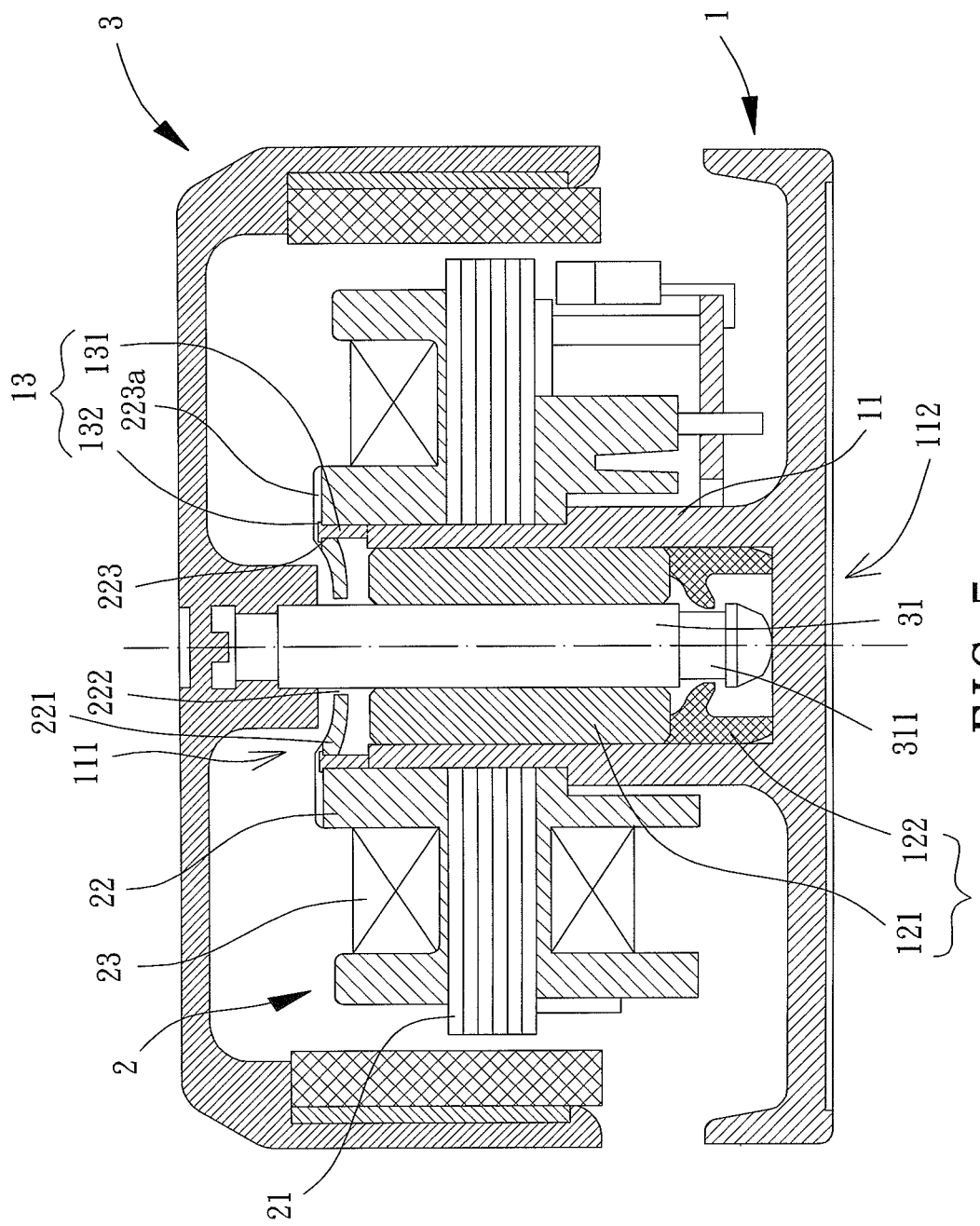
FIG. 5 shows a cross sectional view of another example of the motor according to the present invention, with a positioning member formed on an end face of an open end of the shaft tube of the motor.

The base 1 includes at least one positioning member 13 on the shaft tube 11. The positioning member 13 includes an engaging section 131 for engaging with a predetermined portion of the stator 2. Preferably, the engaging section 131 extends above the open end 111 of the shaft tube 11 in a longitudinal direction of the shaft tube 11 according to the direction of the drawing sheet. With reference to FIG. 4, an end of the engaging section 131 is used to fix the stator 2. As an example, an end of the engaging section 131 distant to the open end 111 can be processed to form a fixing portion 132 for positioning the stator 2. Positioning of the stator 2 will be described hereinafter. The positioning member 13 can be a column formed on an outer periphery or an inner periphery of the shaft tube 11, with the column including the engaging section 131 extending beyond the open end 111 of the shaft tube 11, and with an end of the column distant to the open end 111 forming the fixing portion 132. Alternatively, in another example shown in FIG. 5, the positioning member 13 can include at least one column formed on an end face of the open end 111 of the shaft tube 11, with the column including the engaging section 131 extending beyond the open end 111 of the shaft tube 11, and with an end of the column distant to the open end 111 forming the fixing portion 132.

In a further example, the positioning member 13 according to the present invention can include a plurality of columns formed on the outer periphery of the shaft tube 11 and the end face of the open end 111. In still another example, the positioning member 13 can include a plurality of columns formed on the inner periphery of the shaft tube 11, the outer periphery of the shaft tube 11, and the end face of the open end 111, providing enhanced structural strength for the positioning member 13.

The stator 2 is mounted to the outer periphery of the shaft tube 11 of the base 1. The stator 2 can be of any structure capable of driving the rotor 3 to rotate. With reference to FIG. 4, in the example in which the positioning member 13 is a column formed on the outer periphery of the shaft tube 11, the stator 2 preferably includes a restraining groove 24. More preferably, the restraining groove 24 is formed between the stator 2 and the outer periphery of the shaft tube 11. The column is engaged in the restraining groove 24 to prevent rotation of the stator 2 relative to the positioning member 13. In this embodiment, the stator 2 includes a silicon steel plate unit 21, an insulating bobbin unit 22, and a coil unit 23. The silicon steel plate unit 21 and insulating bobbin unit 22 are stacked. The coil unit 23 is wound around a predetermined portion of the insulating bobbin unit 22. However, the insulating bobbin unit 22 can envelope the silicon steel plate unit 21 by injection molding.

Figure 6:
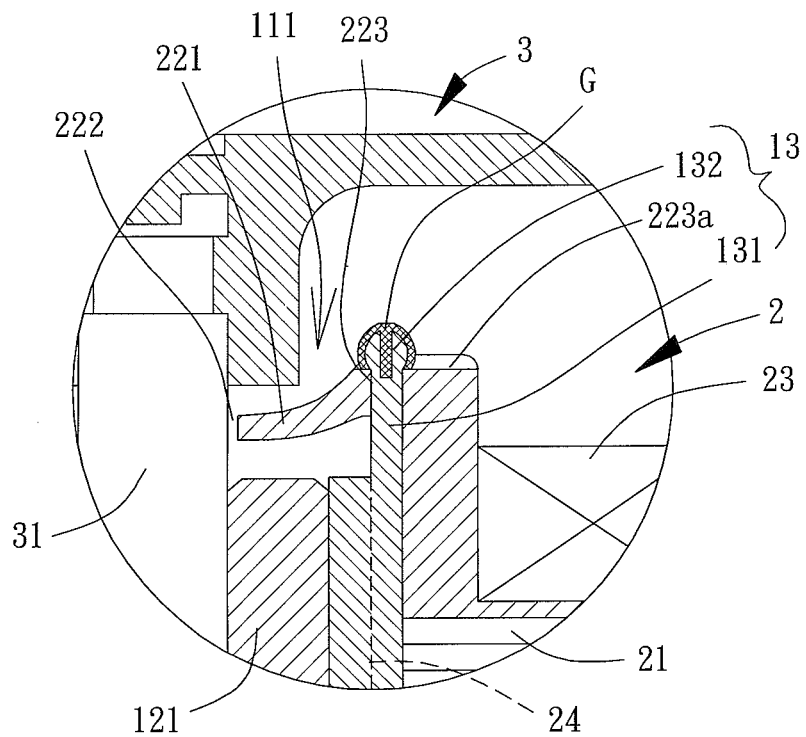
FIG. 6 shows an enlarged cross sectional view of a portion of a further example of the motor according to the present invention, with the positioning member fixed by snapping engagement or gluing.
Figure 7:
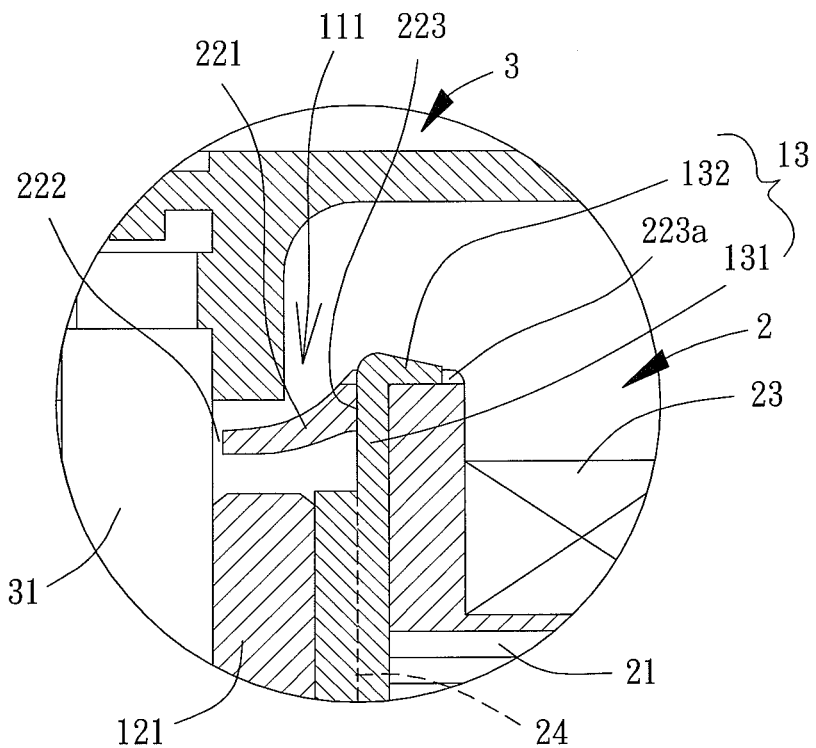
FIG. 7 shows an enlarged cross sectional view of a portion of still another example of the motor according to the present invention, with the positioning member punched to provide a positioning effect.

The insulating bobbin unit 22 includes an extension 221 extending in the radial direction to the open end 111 of the shaft tube 11. The extension 221 includes a through-hole 222 in a center thereof. The rotor 3 extends through the through-hole 222 to engage with the inner assembly 12 in the shaft tube 11 of the base 1. The extension 221 of the insulating bobbin unit 22 includes at least one engagement hole 223 adjacent the through-hole 222. The engaging section 131 of the positioning member 13 of the base 1 extends through the engagement hole 223 of the insulating bobbin unit 22 for subsequent processing for forming the fixing portion 132. In the example shown in FIG. 4, the fixing portion 132 of the positioning member 13 is a punched or a heat fusion section. Specifically, after extending the end of the engaging section 131 through the engagement hole 223, the end of the engaging section 131 is processed by punching or heat fusion to form the fixing portion 132. An outer diameter of the fixing portion 132 is larger than a diameter of the engagement hole 223 to position the extension 221, retaining the stator 2 on the shaft tube 11. In another example shown in FIG. 6, the fixing portion 132 of the positioning member 13 is in the form of a snap fastener that can be forcibly inserted through the engagement hole 223 and protrude from the engagement hole to fix on the surface of the insulating bobbin unit. The snap fastener is preferably fixed on the insulating bobbin unit by glue G to provide a further enhanced positioning effect. In another example shown in FIG. 7, the fixing portion 132 of the positioning member 13 can be a deformed section or a bent section. Specifically, after extending the end of the engaging section 131 through the engagement hole 223, the end of the engaging section 131 is deformed or bent by heat fusion or the like to rapidly fix the extension 221, providing enhanced processing convenience.

With reference to FIGS. 3 and 4, the insulating bobbin unit 22 preferably includes a recessed portion 223a adjacent the through-hole 222, with the engagement hole 223 located in the recessed portion 223a. Thus, the fixing portion 132 of the positioning member 13 is received in the recessed portion 223a to prevent the rotor 3 from coming into contact with the fixing portion 132, assuring smooth rotation of the rotor 3.

The rotor 3 includes a shaft 31 extending through the through-hole 222 of the insulating bobbin unit 22 and rotatably coupled to the inner assembly 12 in the shaft tube 11 of the base 1. In the example shown in FIG. 4, the shaft 31 includes a retaining groove 311 in an outer periphery thereof. The shaft 31 is rotatably received in the bearing 121, and the retainer 122 extends into the retaining groove 311 to prevent the rotor 3 from disengaging from the shaft tube 11. The rotor 3 can operate with the stator 2 to generate an alternating magnetic field, such that the stator 2 can drive the rotor 3 to rotate. Detailed structure and operation of the stator and rotor of a motor can be appreciated by one having ordinary skill in the art and, thus, are not described to avoid redundancy.

Based on the same technical concept in which the extension 221 of the insulating bobbin unit 22 extends in the radial direction to the open end 111 of the shaft tube 11, the insulating bobbin unit 22 can include various examples.

In the example shown in FIG. 4, after the extension 221 of the insulating bobbin unit 22 extends to a position above the open end 111 of the shaft tube 11, since the shaft 31 and the positioning member 13 respectively extend through through-hole 222 and the engagement hole 223, a small gap exists between an inner periphery of the through-hole 222 and the shaft 31 between an inner periphery of the engagement hole 223 and the positioning member 13. Thus, the extension 221 can close almost the entire area of the open end 111 of the shaft tube 11 to provide a dustproof effect and/or lubrication oil maintaining effect.

Figure 8:
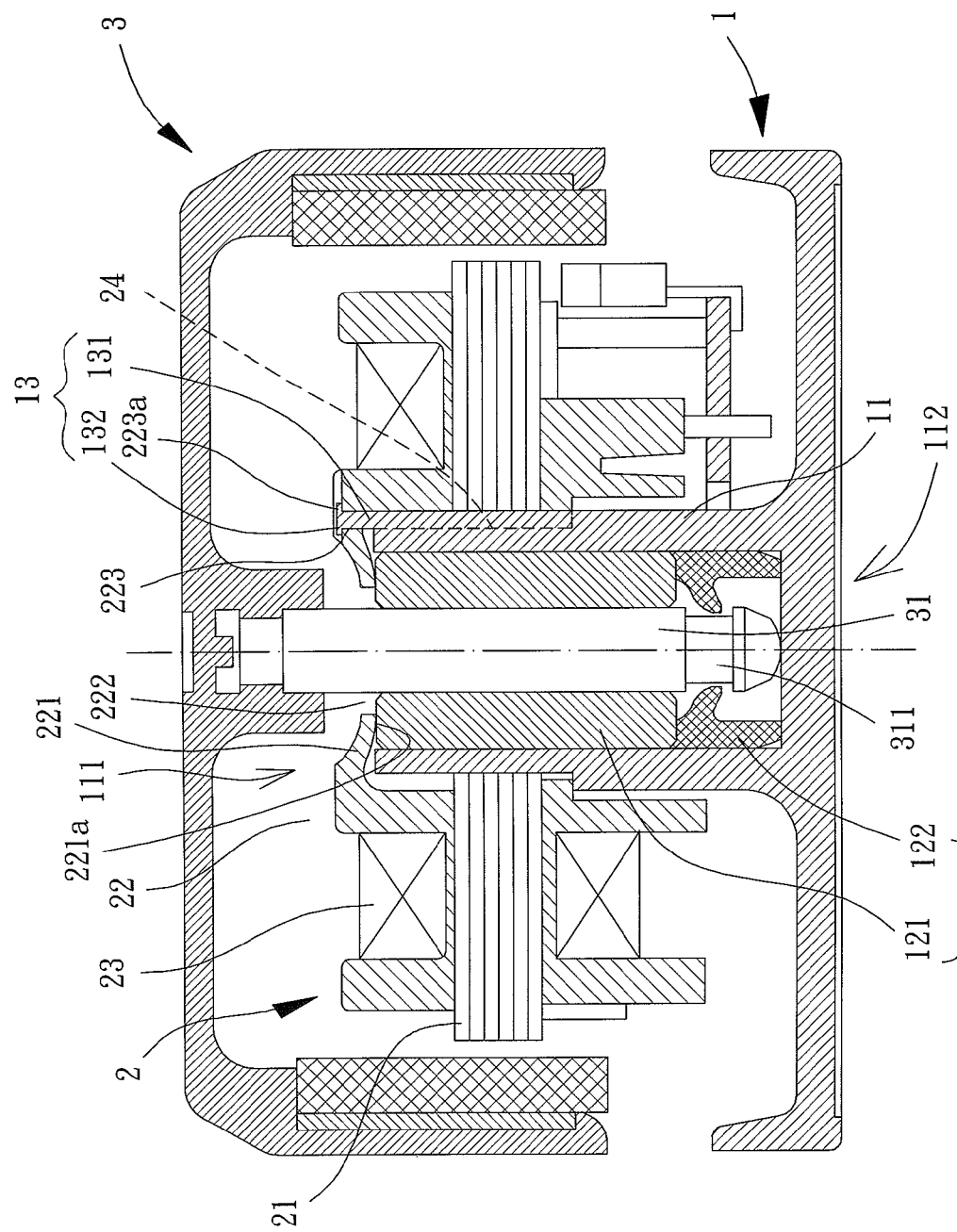
FIG. 8 shows a cross sectional view of yet another example of the motor according to the present invention, with an insulating bobbin unit of the motor pressing against the inner assembly in the shaft tube.

In another example shown in FIG. 8, the extension 221 of the insulating bobbin unit 22 further includes a pressing face 221a that faces and presses against the inner assembly 12 in the shaft tube 11. By cooperating with the fixing portion 132 of the positioning member 13 that fixes the extension 221, the insulating bobbin unit 22 can more reliably press against the inner assembly 12.

Figure 9:
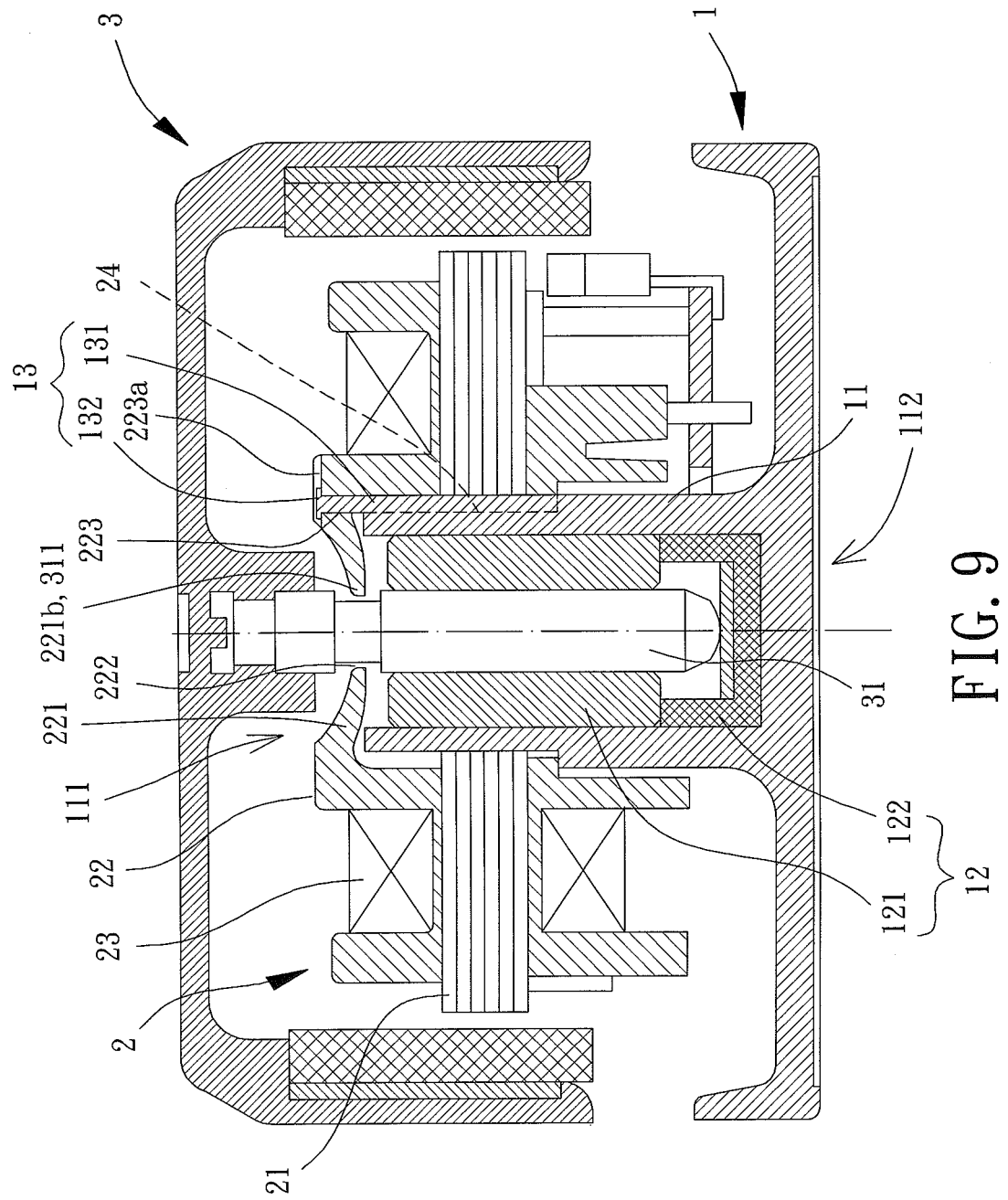
FIG. 9 shows a cross sectional view of still another example of the motor according to the present invention, with a rotor of the motor retained by the insulating bobbin unit.

In another example shown in FIG. 9, the extension 221 of the insulating bobbin unit 22 further includes a retaining end 221b, with the retaining groove 311 of the shaft 31 aligned with the retaining end 221b. Thus, the retaining end 221b can extend into the retaining groove 311. By cooperating with the fixing portion 132 of the positioning member 13 that fixes the extension 221, the insulating bobbin unit 22 can achieve the function of the retainer 122 in FIG. 4, simplifying the overall structure (by substitution of the retainer 122) while retaining the rotor 3 in place to prevent disengagement of the rotor 3.

Figure 10:
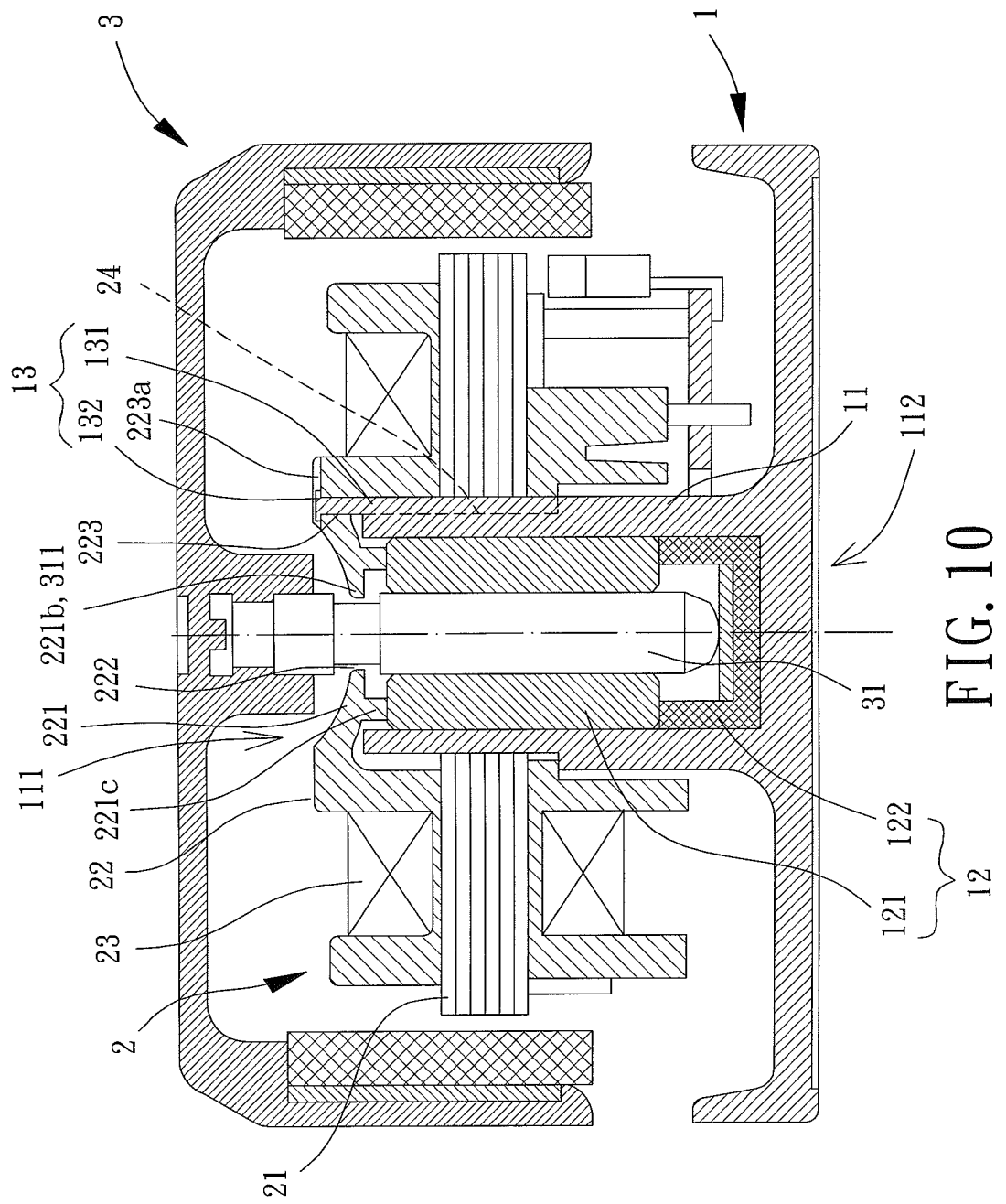
FIG. 10 shows a cross sectional view of yet another example of the motor according to the present invention, with the insulating bobbin unit pressing against an inner assembly in the shaft tube and retaining the rotor.

In another example shown in FIG. 10, the extension 221 of the insulating bobbin unit 22 also includes a retaining end 221b, with the retaining groove 311 aligned with the retaining end 221b. Thus, the retaining end 221b can extend into the retaining groove 311. The extension 221 of the insulating bobbin unit 22 further includes a protrusion 221c extending towards the inner assembly. 12 in the shaft tube 11. The protrusion 221c presses against the inner assembly 12. By cooperating with the fixing portion 132 of the positioning member 13 that fixes the extension 221, the insulating bobbin unit 22 not only prevents disengagement of the rotor 3 by retaining the rotor 3 but also reliably presses against the inner assembly 12.

In view of the foregoing, the motor according to the present invention utilizes the extension 221 of the insulating bobbin unit 22 of the stator 2 to provide advantages including closing the open end 111 of the shaft tube 11, pressing against the inner assembly 12, and retaining the rotor 3, reducing structural complexity. Furthermore, the engaging reliability of the stator 2 can be enhanced by the engagement of the positioning member 13 of the base 1 and the insulating bobbin unit 22.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:
1. A motor comprising:
a base including a shaft tube having an open end, with an inner assembly received in the shaft tube;

a stator mounted to the outer periphery of the shaft tube, with the stator including a silicon steel plate unit, an insulating bobbin unit and a coil unit; and a rotor including a shaft, with the shaft rotatably coupled to the inner assembly in the shaft tube;

with the insulating bobbin unit of the stator including an extension extending to the open end of the shaft tube, with the extension including an upper surface, a lower surface opposite to the upper surface, and a through-hole, with the shaft extending through the through-hole, with the lower surface being intermediate the shaft tube and the upper surface, with the insulating bobbin unit including an engagement hole extending through the extension between the upper and lower surfaces, with the shaft tube of the base including a positioning member having an engaging section, with the engaging section extending through the engagement hole past the upper surface, with the insulating bobbin unit fixed in place by an end of the engaging section abutting with the upper surface.

2. The motor as claimed in claim 1, with the lower surface of the extension of the insulating bobbin unit including a pressing face, with the pressing face facing and pressing against the inner assembly in the shaft tube.

3. The motor as claimed in claim 1, with the shaft including an outer periphery having a retaining groove, with the extension of the insulating bobbin unit including a retaining end, with the retaining groove of the shaft aligned with the retaining end, with the retaining end extending into the retaining groove.

4. The motor as claimed in claim 1, with the shaft including an outer periphery having a retaining groove, with the extension of the insulating bobbin unit including a retaining end, with the retaining groove of the shaft aligned with the retaining end, with the retaining end extending into the retaining groove, with the extension of the insulating bobbin unit including a protrusion, and with the protrusion pressing against the inner assembly in the shaft tube.

5. The motor as claimed in claim 1, with an end of the positioning member forming a fixing portion, with the fixing portion abutting the upper surface and fixing the insulating bobbin unit.

6. The motor as claimed in claim 5, with the engaging section of the positioning member extending beyond the open end of the shaft tube in a longitudinal direction of the shaft tube, and with the fixing portion formed on the end of the engaging section distant to the open end.

7. The motor as claimed in claim 6, with the positioning member including a column formed on an outer periphery or an inner periphery of the shaft tube, with the column including the engaging section extending beyond the open end of the shaft tube, and with an end of the column distant to the open end forming the fixing portion.

8. The motor as claimed in claim 6, with the positioning member including a column formed on an outer periphery of the shaft tube, with the column including the engaging section extending beyond the open end of the shaft tube, with an end of the column distant to the open end forming the fixing portion, with the stator including a restraining groove, and with the column engaged in the restraining groove.

9. The motor as claimed in claim 6, with the positioning member including a column formed on an end face of the open end of the shaft tube, with the column including the engaging section extending beyond the open end of the shaft tube, and with an end of the column distant to the open end forming the fixing portion.

10. The motor as claimed in claim 6, with the positioning member including a plurality of columns formed on an outer periphery of the shaft tube and an end face of the open end.

11. The motor as claimed in claim 6, with the positioning member including a plurality of columns formed on an inner periphery of the shaft tube and an end face of the open end.

12. The motor as claimed in claim 6, with the positioning member including a plurality of columns formed on an inner periphery of the shaft tube, an outer periphery of the shaft tube, and an end face of the open end.

13. The motor as claimed in claim 5, with the fixing portion being a punched section or a heat fusion section, and with the fixing portion having an outer diameter larger than a diameter of the engagement hole of the insulating bobbin unit.

14. The motor as claimed in claim 5, with the fixing portion of the positioning member being a snap fastener, and with the snap fastener forcibly inserted through the engagement hole of the insulating bobbin unit and protruding from the engagement hole to fix on a surface of the insulating bobbin unit.

15. The motor as claimed in claim 5, with the fixing portion of the positioning member and the extension being fixed by glue.

16. The motor as claimed in claim 5, with the fixing portion of the positioning member being a deformed section or a bent section, and with the extension fixed by the deformed section or the bent section.

17. The motor as claimed in claim 16, with the deformed section or the bent section being a heat fusion section.

18. The motor as claimed in claim 5, with the insulating bobbin unit including a recessed portion extending from the upper surface towards but spaced from the lower surface and adjacent the through-hole, with the engagement hole located in the recessed portion, and with the fixing portion of the positioning member received in the recessed portion.

19. The motor as claimed in claim 1, with the shaft tube including a closed end opposite to the open end, with the inner assembly including a bearing and a retainer, with the bearing located adjacent to the open end, with the retainer located adjacent to the closed end, with the retainer located between the bearing and the closed end, with the shaft including an outer periphery having a retaining groove, and with the retainer extending into the retaining groove.

20. The motor as claimed in claim 1, with the insulating bobbin unit enveloping the silicon steel plate unit by injection molding.

21. The motor as claimed in claim 1, with the silicon steel plate unit and the insulating bobbin unit being stacked.

* * * * *